United States Patent Office 3,009,365
Patented Nov. 21, 1961

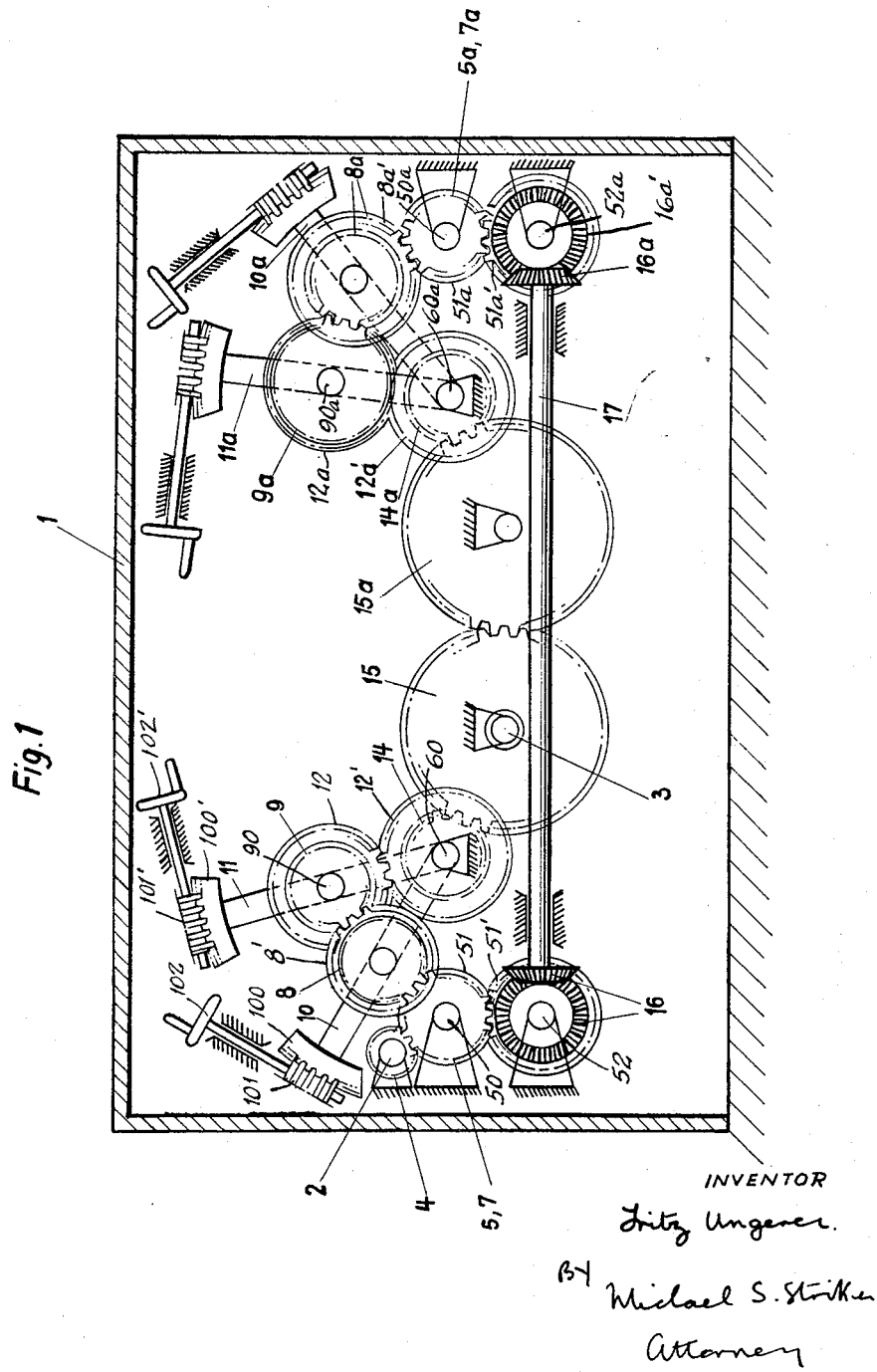

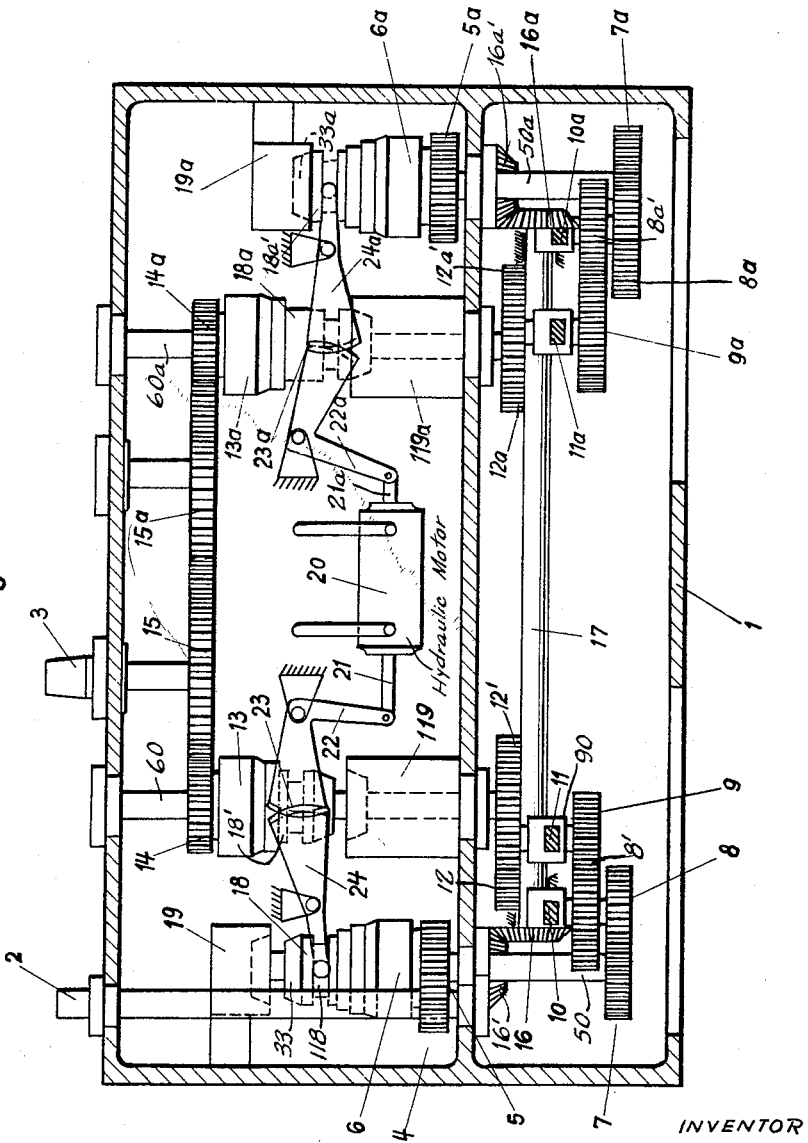

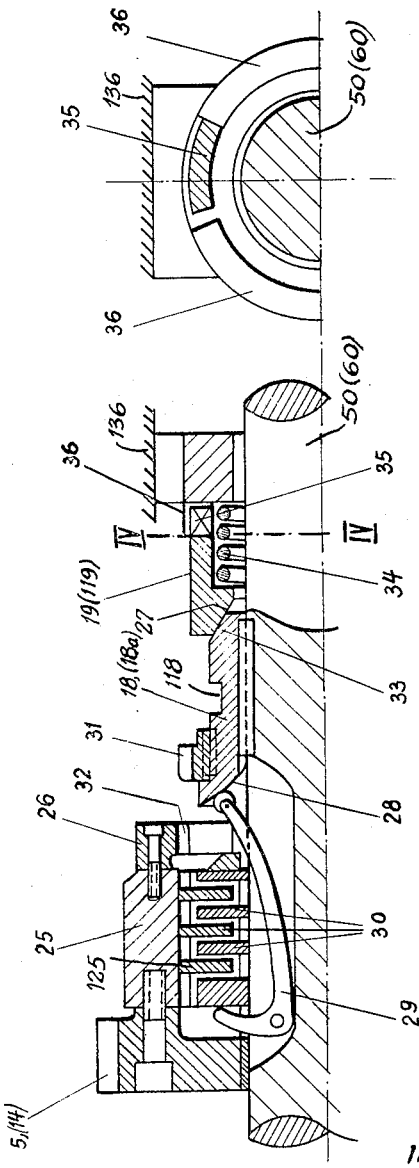

3,009,365
CHANGE-WHEEL-GEARING FOR THE ACTUA-
TION OF FLYING SHEARS
Fritz Ungerer, Arlingerstrasse 6, Pforzheim, Germany
Filed Feb. 11, 1959, Ser. No. 792,594
Claims priority, application Germany Feb. 18, 1958
14 Claims. (Cl. 74—375)

The present invention relates to a change gear transmission arrangement, and more particularly to an arrangement of this type for the actuation of flying shears which move along a continuously running material which is to be cut.

Flying shears are generally moved at the speed of the running material while the cutting operation is carried out. If it is desired to change the length of each cut piece, while keeping the speed of the material unchanged, it is necessary to move the flying shears temporarily at a higher speed than the speed of the moving material, and then to slow down the shears to the speed of the moving material as is required for the cutting operation.

For operations of this type, it is necessary to provide change gear means, and in accordance with the prior art the exchange of gears having a different transmission ratio required the stopping of the gear transmission and consequently of the flying shears. Since it is desirable that the material continues its movement, the prior art requires the storing of the material while the operation of the flying shears is interrupted. For example, a metal band passing at constant speed through an electro-plating bath containing tin, may be stored in large loops in special towers provided for this purpose.

Such storing towers take up a great deal of space, and it is one object of the present invention to provide a change gear transmission arrangement, particularly suited for the above explained purpose, which permits the continuous running of the band material without interruption of the cutting operations, and the related storing of the band material.

Another object of the present invention is to provide two transmissions, each of which permits the driving of a driven shaft from a drive shaft, and to render the two transmissions alternately operative, so that the change gears of the inoperative transmission may be changed without necessitating stopping of the driven shaft.

With these objects in view, the present invention mainly consists in a change gear transmission arrangement comprising a drive means, a driven means, preferably for driving flying shears, a first transmission and a second transmission, each transmission including change gear means and coupling means connecting the change gear means to said drive means and driven means, and operating means connected to said coupling means and operating the same in such a manner that the change gears of one transmission are separated from the drive means and driven means, while the driven means are driven from the drive means through the other transmission.

Preferably the coupling means have friction clutch parts which are simultaneously operative during the switching of the transmission arrangement from one transmission to the other transmission. In the operative driving condition of each transmission, however, claw-type couplings are effective.

Additional features and advantages of the invention will be best understood from a consideration of the following detailed description taken in connection with the accompanying drawing, in which:

FIG. 1 is a diagrammatic side view of a change gear transmission arrangement according to the present invention;

FIG. 2 is a schematic plan view of the arrangement shown in FIG. 1;

FIG. 3 is a longitudinal sectional view through a coupling means used in the embodiment illustrated in FIGS. 1 and 2; and FIG. 4 is a cross-sectional view taken on line IV—IV in FIG. 3.

Referring now to the drawings, and more particularly to FIGS. 1 and 2, a housing 1 shown in section, supports several shafts for turning movement. A drive shaft 2 is driven by a motor, not shown, and drive means for the flying shears, not shown, are driven by the driven shaft 3. A pinion 4 on drive shaft 2 meshes with a gear 5 which is connected through a coupling means 6 to a shaft 50 which carries at its end a fixed gear 7 which meshes with a change gear 8 mounted on an adjustable support 10 and is connected to a change gear 8' for rotation. Support 10 is mounted on a shaft 60 for turning movement, and has at its outer end a worm gear sector 100 which is moved by a worm 101 driven by a hand wheel 102. Change gear 8' meshes with another change gear 9 which is detachably mounted on a support 11 which is also turnable about shaft 60, and is operated by a worm drive 100', 101' and 102'. When change gears 8' and 9 of different diameter are to be used, the supports 10 and 11 are correspondingly adjusted.

Shaft 90 of change gear 9 carries a gear 12 which meshes with another gear 12' mounted on shaft 60 which is connected through a coupling means 13 to a gear 14 which meshes with a gear 15 fixed on the driven shaft 3. Coupling means 13 includes a movable part which is braked by a brake means 119 when the coupling means 13 is disconnected. Coupling means 6 cooperates with a corresponding brake means 19, which is opertive to engage the conical brake portion 33 of coupling means 6 when the coupling means is disengaged. This arrangement will be described in greater detail hereinafter with reference to FIGS. 3 and 4.

It is evident that the change gear means 8 and 9 can be easily changed when the first coupling means 6, and the second coupling means 13 are disengaged.

Shaft 50, on which gear 5 is mounted, carries another gear 51 (see FIG. 1), which meshes with a gear 51' on a shaft 52 which carries a first bevel gear 16' meshing with another bevel gear 16 fixed on a shaft 17. On the other end of shaft 17, a bevel gear 16a is fixed and meshes with a further bevel gear 16a' secured to a shaft 52a which also carries a gear 51a' meshing with a gear 51a. Gear 5a is fixed on shaft 52a and connected through coupling means 6a to the shaft 50a on which another gear 7a is fixed. Gear 7a meshes with a change gear 8a mounted on a support 10a, and a change gear 8a' is connected to change gear 8a and meshes with another change gear 9a mounted on a support 11a. Supports 10a and 11a can be adjusted in accordance with a diameter of the change gears 9a and 8a as described with reference to the support 10 and 11.

Change gear 9a is mounted on a shaft 90a which is connected by a pair of meshing gears 12a, 12a' to the shaft 60a. Shaft 60 carries a gear 14 meshing with the gear 15 on shaft 3, and shaft 60a carries a gear 14a meshing with a gear 15 meshing with gear 15. Consequently, driven shaft 3 can be driven either through the transmission shown on the left side of FIG. 1, or through the corresponding transmission shown on the right side of FIG. 1 in accordance with the positions of the coupling means 13, 6, 13a and 6a. Coupling means 13a cooperates with a brake means 119a, and coupling means 6a cooperates with a brake means 19a.

Coupling means 6, 13, 6a, and 13a will now be described with reference to FIGS. 3 and 4. These coupling means are all of the same construction, and a shaft shown in FIGS. 3 and 4 is either shaft 50, or shaft 60. The gear 5 is mounted on shaft 50 for rotation, as is the gear 14 on shaft 60. Gear 5 is secured to a clutch member 25 which carries a set of annular friction discs 125. Another set of friction discs 30 is mounted on shaft 50 non-rotatably but movable in axial direction from the disengaged position shown in FIG. 3 to a coupling position in which friction discs 30 are in frictional engagement with friction discs 125. An angular lever 29 is turnably mounted in a groove in shaft 50, and has one end engaging the movable clutch part 30, and another end cooperating through a roller with a cam face 28 on a shiftable member 18, or 18', 18a, 18a', respectively, which is mounted on shaft 50, or on shafts 60, 60a, 50a, respectively, for movement in axial direction, but non-turnable. Shifting of member 18 to the left as viewed in FIG. 3, will effect turning of angular lever 29 and shifting of the movable clutch part 30 to a coupling position. An annular coupling member 26 is fixed to clutch member 25 and has a set of inner teeth or claws 32 which are engaged by matching teeth or claws 31 which are fixed to the shiftable member 18 and constitute a movable coupling part. When shifting member 18 is shifted beyond the second position in which the clutch 25, 30 is engaged, claws 31 and 32 engage each other and form a positive, non-frictional coupling between shaft 50 and gear 5.

Shifting member 18 has a brake portion 33 of conical shape which frictionally engages a matching brake surface 27 on braking means 19 (or 119, 119a, 19a) in the disengaged first position of clutch 25, 30 and coupling 31, 32 shown in FIG. 3. Braking means 19 can move in axial direction against the action of a spring 34, and has at its end a brake claw means 35 projecting into a cutout in a braking member 36 as best seen in FIG. 4. Braking member 36 is fixed to a stationary part 136. Member 35 has some play in member 36, which facilitates the arrangement of different change gear means in meshing positions.

A hydraulic servo motor 20 is mounted in housing 1 and operates through rods 21, 21a, a pair of angular actuating levers 22, 22a which are turnably mounted in the housing 1 and have gear sectors 23 meshing with gear sectors on a pair of levers 24, 24a which are also turnably mounted in housing 1.

Levers 24 and 24a have pins at the ends thereof which project into annular grooves 118 in the shifting members 18 of the respective pairs of coupling means 6, 13 and 6a, 13a.

The device operates as follows:

In the position shown in FIG. 2, hydraulic motor 20 was operated to shift through levers 22a and 24a the coupling means 6a and 13a to the disengaged position shown in FIG. 3 in which the brake means 119 stop shaft 50a, the movable coupling part 31, and the movable clutch part 30 from rotation, while clutch 25, 30 and coupling 31, 32 are disengaged. Consequently, the change gear means 8a, 8a' and 9a can be exchanged for other change gears.

At the same time, the coupling means 6 and 13 are in the coupled position in which the coupling members 31 and 32 engage each other so that the driven shaft is positively and non-frictionary driven from the drive shaft through coupling means 6, gears 4, 5, 7, change gears 8 and 9, shaft 90, gears 12, shaft 60 and engaged coupling 13. When hydraulic motor 20 is operated, the coupling means 6 and 13 are shifted to the disengaged position shown in FIG. 3, and the coupling means 6a and 13a are shifted to the position in which the coupling members 31 and 32 positively engage each other. Change gears 8, 8' and 9 can now be exchanged, and the supports 10 and 11 may be adjusted for this purpose by operation of the hand wheels 102 and 102'.

While the coupling means 6, 13, 13a and 6a are simultaneously shifted, they all pass through an intermediate position in which the respective coupling members 31, 32 are not yet engaged, but in which the friction clutches 25, 30 are in frictional engagement to effect a smooth transition from the condition in which driven shaft 3 is driven through the transmission shown on the right of FIG. 2 to the condition in which shaft 3 is driven through the transmission on the left of FIG. 2.

Due to the fact that both first and second coupling means of each transmission are simultaneously shifted to a disengaged position, and fully braked, the change gears can be exchanged without any danger of being rotated by partly engaged clutch means 25, 30 which may happen if the oil in the clutch is cold. When the flying shears are driven from shaft 3, they are positively and non-frictionary coupled to driven shaft 2, as is desired, while the transport of the moving web band need not be stopped during exchange of change gears.

While the invention has been illustrated and described as embodied in an apparatus for actuating flying shears alternately through two transmission, each of which includes change gear means and coupling means, it is not intended to be limited to the details shown, since various modifications may be made without departing from the spirit of the present invention.

What I claim as new and desire to secure by Letters Patent of the United States is:

1. Change gear transmission arrangement comprising in combination, a drive shaft means; a driven shaft means; a first transmission and a second transmission, each transmission including change gear means, a first coupling means connecting said change gear means to said drive shaft means, and a second coupling means connecting said change gear means to said driven shaft means, each coupling means including a friction clutch having a movable clutch part and a claw-type coupling having a movable coupling part operatively connected to said movable clutch part for movement therewith between a first position in which said friction clutch and said claw-type coupling are disengaged to separate said change gear means from said drive shaft means and driven shaft means to permit the change of change gears, a second position in which said friction clutch is engaged, and a third position in which said claw-type coupling positively connects said drive shaft means to said driven shaft means through said change gear means; and operating means operatively connected to said movable parts of said first transmission, and to said movable parts of said second transmission in such a manner that said movable parts of one of said transmissions are in said first position when said first and second coupling means of the other transmission are in said third position whereby the change gear means of said one transmission can be changed while said driven shaft means is driven from said drive shaft means through said other transmission.

2. Change gear transmission arrangement comprising in combination, a drive shaft means; a driven shaft means; a first transmission and a second transmission, each transmission including change gear means, a first coupling means connecting said change gear means to said drive shaft means, and a second coupling means connecting said change gear means to said driven shaft means, each coupling means including a friction clutch having a movable clutch part and a claw-type coupling having a movable coupling part operatively connected to said movable clutch part for movement therewith between a first position in which said friction clutch and said claw-type coupling are disengaged to separate said change gear means from said drive shaft means and driven shaft means to permit the change of change gears, a second position in which said friction clutch is engaged, and a third position in which said claw-type coupling positively connects said drive shaft means to said driven shaft means through said change gear means; and operating means operatively connected to said movable parts of said first transmission, and to said movable parts of said second transmission in such a manner that said movable parts of one of said transmissions are in said first position when said first and second coupling means of the other transmission are in said third position whereby the change gear means of said one transmission can be changed while said driven shaft means is driven from said drive shaft means through said other transmission, and so that said movable parts of said coupling means of one of said transmissions are in said second position, during movement to said first position while said movable parts of said coupling means of the other transmission are at the same time in said second position during movement to said third position.

3. Change gear transmission arrangement comprising in combination, a drive means; a driven means; a first transmission and a second transmission, each transmission including change gear means, and a coupling means connecting said change gear means to said means, each coupling means including a friction clutch having a movable clutch part and a claw-type coupling having a movable coupling part operatively connected to said movable clutch part for movement therewith between a first position in which said friction clutch and said claw-type coupling are disengaged to separate said change gear means from said drive means and driven means to permit the change of change gears, a second position in which said friction clutch is engaged, and a third position in which said claw-type coupling positively connects said drive means to said driven means through said change gear means; and operating means operatively connected to said movable parts of said first transmission, and to said movable parts of said second transmission in such a manner that said movable parts of one of said transmissions are in said first position when said coupling means of the other transmission are in said third position whereby the change gear means of said one transmission can be changed while said driven means is driven from said drive means through said other transmission.

4. Change gear transmission arrangement comprising in combination, a drive means; a driven means; a first transmission and a second transmission, each transmission including change gear means, and a coupling means connecting said change gear means to said means, each coupling means including a friction clutch having a movable clutch part and a claw-type coupling having a movable coupling part operatively connected to said movable clutch part for movement therewith between a first position in which said friction clutch and said claw-type coupling are disengaged to separate said change gear means from said drive means and driven means to permit the change of change gears, a second position in which said friction clutch is engaged, and a third position in which said claw-type coupling positively connects said drive means to said driven means through said change gear means; and operating means operatively connected to said movable parts of said first transmission, and to said movable parts of said second transmission in such a manner that said movable parts of one of said transmissions are in said first position when said coupling means of the other transmission are in said third position whereby the change gear means of said one transmission can be changed while said driven means is driven from said drive means through said other transmission, and so that said movable parts of said coupling means of one of said transmissions are in said second position, during movement to said first position while said movable parts of said coupling means of the other transmission are at the same time in said second position during movement to said third position.

5. Change gear transmission arrangement comprising in combination, a drive shaft means; a driven shaft means; a first transmission and a second transmission, each transmission including change gear means, a first coupling means connecting said change gear means to said drive shaft means, and a second coupling means connecting said change gear means to said driven shaft means; each coupling means including a friction clutch having a movable clutch part and a claw-type coupling having a movable coupling part operatively connected to said movable clutch part for movement therewith between a first position in which said friction clutch and said claw-type coupling are disengaged to separate said change gear means from said drive shaft means and driven shaft means to permit the change of change gears, a second position in which said friction clutch is engaged, and a third position in which said claw-type coupling positively connects said drive shaft means to said driven shaft means through said change gear means, each of said coupling means including a brake part connected to said coupling part and to said clutch part for movement with the same; a plurality of brake means, each brake means cooperating with one of said brake parts of said coupling means so that the respective brake part frictionally engages the respective brake means in said first position of said movable parts whereby said movable parts are blocked; and operating means operatively connected to said movable parts of said first transmission, and to said movable parts of said second transmission in such a manner that said movable parts of one of said transmissions are in said first position when said first and second coupling means of the other transmission are in said third position whereby the change gear means of said one transmission can be changed while said driven shaft means is driven from said drive shaft means through said other transmission.

6. Change gear transmission arrangement comprising in combination, a drive shaft means; a driven shaft means; a first transmission and a second transmission, each transmission including change gear means, a first coupling means connecting said change gear means to said drive shaft means, and a second coupling means connecting said change gear means to said driven shaft means, each coupling means including a friction clutch having a movable clutch part and a claw-type coupling having a movable coupling part operatively connected to said movable clutch part for movement therewith between a first position in which said friction clutch and said claw-type coupling are disengaged to separate said change gear means from said drive shaft means and driven shaft means to permit the change of change gears, a second position in which said friction clutch is engaged, and a third position in which said claw-type coupling positively connects said drive shaft means to said driven shaft means through said change gear means, each of said coupling means including a brake part connected to said coupling part and to said clutch part for movement with the same; a plurality of brake means, each brake means cooperating with one of said brake parts of said coupling means so that the respective brake part frictionally engages the respective brake means in said first position of said movable parts whereby said movable parts are blocked; and operating means operatively connected to said movable parts of said first transmission, and to said movable parts of said second transmission in such a manner that said movable parts of one of said transmissions are in said first position when said first and second coupling means of the other transmission are in said third position whereby the change gear means of said one transmission can be changed while said driven shaft means is driven from said drive shaft means through said other transmission, and so that said movable parts of said coupling means of one of said transmissions are in said second position, during movement to said first position while said movable parts of said coupling means of the other transmission are at the same time in said second position during movement to said third position.

7. Change gear transmission arrangement comprising in combination, a drive means; a driven means; a first transmission and a second transmission, each transmission including change gear means, and a coupling means connecting said change gear means to said means, each coupling means including a friction clutch having a movable clutch part and a claw-type coupling having a movable coupling part operatively connected to said movable clutch part for movement therewith between a first position in which said friction clutch and said claw-type coupling are disengaged to separate said change gear means from said drive means and driven means to permit the change of change gears, a second position in which said friction clutch is engaged, and a third position in which said claw-type coupling positively connects said drive means to said driven means through said change gear means, each of said coupling means including a brake part connected to said coupling part and to said clutch part for movement with the same; a plurality of brake means, each brake means cooperating with one of said brake parts of said coupling means so that the respective brake part frictionally engages the respective brake means in said first position of said movable parts whereby said movable parts are blocked; and operating means operatively connected to said movable parts of said first transmission, and to said movable parts of said second transmission in such a manner that said movable parts of one of said transmissions are in said first position when said coupling means of the other transmission are in said third position whereby the change gear means of said one transmission can be changed while said driven means is driven from said drive means through said other transmission.

8. Change gear transmission arrangement comprising in combination, a drive means; a driven means; a first transmission and a second transmission, each transmission including change gear means, and a coupling means connecting said change gear means to said means, each coupling means including a friction clutch having a movable clutch part and a claw-type coupling having a movable coupling part operatively connected to said movable clutch part for movement therewith between a first position in which said friction clutch and said claw-type coupling are disengaged to separate said change gear means from said drive means and driven means to permit the change of change gears, a second position in which said friction clutch is engaged, and a third position in which said claw-type coupling positively connects said drive means to said driven means through said change gear means, each of said coupling means including a brake part connected to said coupling part and to said clutch part for movement with the same; a plurality of brake means, each brake means cooperating with one of said brake parts of said coupling means so that the respective brake part frictionally engages the respective brake means in said first position of said movable parts whereby said movable parts are blocked; and operating means operatively connected to said movable parts of said first transmission, and to said movable parts of said second transmission in such a manner that said movable parts of one of said transmissions are in said first position when said coupling means of the other transmission are in said third position whereby the change gear means of said one transmission can be changed while said driven means is driven from said drive means through said other transmssion, and so that said movable parts of said coupling means of one of said transmissions are in said second position, during movement to said first position while said movable parts of said coupling means of the other transmission are at the same time in said second position during movement to said third position.

9. A change gear transmission arrangement as set forth in claim 1 wherein said change gear means include adjustable supports and at least one pair of meshing change gears detachably mounted on said support.

10. A change gear transmission arrangement as set forth in claim 1 wherein said operating means include hydraulic motor means, and linkage means connected to and operated by said hydraulic motor means and operatively connected to said movable parts of said first and second coupling means of said first and second transmissions for shifting said parts.

11. An arrangement as set forth in claim 10 wherein said linkage means include a pair of linkages respectively connected to said movable parts of said coupling means of said first and second transmissions, each linkage including an actuating lever actuated by said hydraulic motor, and another lever operatively connected to said movable parts of said first and second coupling means of one of said transmissions, said other lever being connected to said actuating lever to be turned by the same.

12. An arrangement as set forth in claim 11 wherein each of said actuating levers has a gear sector and wherein each of said levers has a gear sector meshing with said gear sector of said actuating lever.

13. An arrangement as set forth in claim 1 wherein said friction clutch of each coupling means includes a first set of friction discs mounted on the respective shaft for axial movement to constitute said movable clutch part, a second set of friction discs operatively connected to said change gear means for rotation, and a shifting member mounted on the respective shaft and operatively connected to said movable clutch part; wherein said movable coupling part has a first set of claws, and wherein said coupling includes a second set of claws engaged by said first set of claws in said third position and fixedly secured to the respective second set of friction discs for rotation therewith, said movable coupling part being mounted on the respective shaft non-turnable and shiftable in axial direction to engage and actuate said shifting member to effect engagement of said friction clutch before said sets of claws engage each other.

14. An arrangement as set forth in claim 6 wherein each brake part has a conical brake portion, wherein each brake means has a brake claw means and a conical surface engaged by said conical brake portion in said first position; and including stationary blocking means interlocked with said braking claw means having play with the same to permit slight turning movements of said brake means required by different change gear means.

References Cited in the file of this patent

UNITED STATES PATENTS

| | | |
|---|---|---|
| 2,014,383 | Knox et al. | Sept. 17, 1935 |
| 2,467,987 | Peterson et al. | Apr. 19, 1949 |
| 2,504,409 | Haefeli | Apr. 18, 1950 |
| 2,561,765 | Wood | July 24, 1951 |
| 2,864,481 | Strecker | Dec. 16, 1958 |

FOREIGN PATENTS

| | | |
|---|---|---|
| 804,134 | France | Oct. 16, 1936 |